United States Patent
Nakashima et al.

(10) Patent No.: US 6,395,398 B1
(45) Date of Patent: May 28, 2002

(54) FREQUENCY SELECTIVE PLATE AND METHOD FOR PRODUCING SAME

(75) Inventors: Hiroshi Nakashima; Masaaki Yonekura, both of Mie; Hideaki Wakabayashi, Okayama; Masanobu Kominami, Osaka, all of (JP)

(73) Assignee: Central Glass Company, Limited, Ube (JP)

(*) Notice: Subject to any disclaimer, the term of this patent is extended or adjusted under 35 U.S.C. 154(b) by 0 days.

(21) Appl. No.: 09/451,855

(22) Filed: Dec. 1, 1999

(30) Foreign Application Priority Data

| Mar. 31, 1999 | (JP) | 11-090597 |
| Jun. 4, 1999 | (JP) | 11-157271 |
| Jun. 4, 1999 | (JP) | 11-157704 |
| Jul. 16, 1999 | (JP) | 11-202461 |

(51) Int. Cl.[7] .................. B32B 9/00; B32B 17/06
(52) U.S. Cl. ............ 428/432; 428/323; 428/328; 428/332; 428/402; 428/433; 428/689; 428/699; 428/698
(58) Field of Search .................. 428/323, 328, 428/332, 402, 432, 433, 551, 636, 673, 450, 689, 699, 698

(56) References Cited

U.S. PATENT DOCUMENTS 4,500,399 A * 2/1985 Hart et al.
5,800,925 A * 9/1998 Ando et al.
6,231,987 B1 * 5/2001 Maeda et al.
6,236,167 B1 * 5/2001 Yamaguchi et al.

FOREIGN PATENT DOCUMENTS

| JP | 3-250797 | 11/1991 |
| JP | A-5-42623 | 2/1993 |
| JP | 7-242441 | 9/1995 |
| JP | 8-28592 | 3/1996 |
| JP | 2620456 | 3/1997 |

OTHER PUBLICATIONS

Nakashima, H., Wakabayashi, H., and Kominami, M. (1998) "Application of Silver–Dispersed AlN Thin Film to Solar Control Glass". *Journal of Applied Physics* 84:6285–6290. No month.

* cited by examiner

*Primary Examiner*—Deborah Jones
*Assistant Examiner*—Jennifer McNeil
(74) *Attorney, Agent, or Firm*—Crowell & Moring LLP

(57) ABSTRACT

A frequency selective plate which is produced by coating an Ag layer dispersed with Ag particles on a transparent substrate. The Ag layer is formed by depositing an Ag continuous layer on the substrate and heating the Ag continuous layer to varying into Ag particles or by depositing an Ag continuous layer on the heated substrate. The frequency selective plate performs high transparency of radio waves and visible rays while sufficiently reflecting near-infrared rays of solar radiation.

11 Claims, 7 Drawing Sheets

FREQUENCY SELECTIVE PLATE AND METHOD FOR PRODUCING SAME

BACKGROUND OF THE INVENTION

The present invention relates to a frequency selective plate which performs high transparency of radio waves and visible rays while mainly reflecting near-infrared rays of solar radiation.

Lately, a window pane coated with a conductive thin layer or covered with a film including a conductive thin layer has been practically used for the purpose of shielding solar radiation. If such a window pane is applied to multistoried buildings, the window pane reflects radio waves of TV frequency range to generate ghost image in TV screen and to degrade receiving satellite broadcasting waves through indoor antenna. Further, if such a pane is applied to windows of a residence or an automobile, this functions to degrade the performance of handy telephones and the gain of an antenna embedded in the window pane. In order to solve these problems, a glass plate coated by heat-reflecting film is employed to transmit part of visible rays and to decrease the reflection of radio waves. Further, Japanese Patent No. 2620456 discloses a method for preventing a radio wave trouble by dividing a length of conductive film parallel to a field direction of incident radio waves into 1/20 the wavelength of the radio wave.

However, the former method employing the high-transparent heat-reflecting film is not sufficient in heat-ray shielding performance although a glass plate made by the former method prevents the radio wave trouble by decreasing the reflection of radio waves. Further, a glass plate made by the latter method disclosed in Japanese Patent No. 2620456 reflects visible rays and near-infrared rays since the divided length of the film is greater than the wavelength of the visible ray and near-infrared ray. Therefore, although this glass plate ensures a frequency selective performance having a radio wave transmitting performance and a solar radiation shielding performance, this cannot ensure the transparency of visible rays. Additionally, in case of a large window employing a large-size glass plate such as a glass plate having 2 m×3 m size, it is necessary to take a very long time for cutting a dielectric film into segments of 1/20 satellite broadcasting wavelength of about 25 mm by means of a yttrium-aluminium-garnet (YAG) laser.

SUMMARY OF THE INVENTION

It is therefore an object of the present invention to provide an improved frequency selective plate having a radio wave transparency, and more particularly to a frequency selective plate which decreases a reflectance of radio waves ranging frequency band of TV broadcasting, satellite broadcasting and handy phone and prevents radio wave interference noise while preferably ensuring solar shielding performance and visual lay transparency.

An aspect of the present invention resides in a frequency selective plate which has a radio wave transparent property and comprises a substrate and an Ag layer which is dispersed with Ag particles and coated on said substrate.

Another aspect of the present invention resides in a production method of a frequency selective plate which method comprises the steps of (a) forming an Ag continuous layer on a substrate and (b) varying the Ag continuous layer into an Ag layer dispersed with Ag particles.

DETAILED DESCRIPTION OF THE INVENTION

Figure 1:
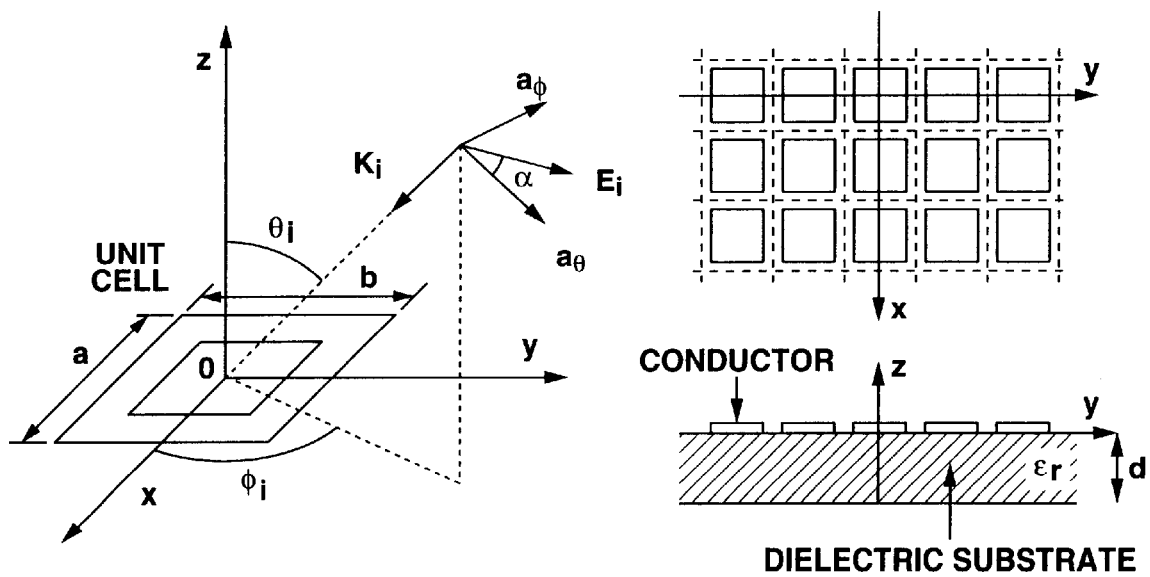
FIG. 1 is a geometrical view showing a model of scatterer for explaining the geometry of periodic array and electromagnetic wave.

A frequency selective plate having a radio wave transmitting property is made by coating an Ag (silver) layer dispersed with Ag (silver) particles on a surface of a substrate or a substrate coated with a transparent dielectric layer.

It is possible to produce an objective frequency selective plate representatively by means of the following two methods:

In a first method, such an objective substrate is produced by forming an Ag continuous layer on a surface of a substrate or a transparent dielectric layer coated substrate by means of sputtering and by varying a state of Ag of the Ag continuous layer into Ag particles by means of heat treatment. The Ag particles produced by this first method are large in size and perform an excellent crystallinity to perform a high electric conductivity therein. Therefore, it is respected that the frequency selective plate produced by this first method performs high heat-ray reflecting performance.

In a second method, the surface of the substrate or the dielectric layer coated substrate is heated, and the Ag continuous layer is directly formed on the surface of the heated substrate. Due to the heated surface, Ag of the continuous layer is varied into Ag particles. The Ag particles produced by this second method are equivalent in size and perform an excellent frequency selective performance.

Furthermore, it is possible to produce a second Ag continuous layer on the Ag particle dispersed layer produced by the second method. The second Ag continuous layer is heat-treated to vary Ag in the second Ag continuous layer into Ag particles. With this method, the Ag particles becomes equivalent and large in size. The temperature of the substrate during depositing the second Ag continuous layer is not limited to a predetermined temperature, but it is preferable that the temperature is set near a room temperature. Further, it is preferable that the heat-treatment temperature of the second Ag continuous layer is set within a range 100° C. to 500° C. and the heating time at the heat-treatment temperature is set within a range 5 minutes to 180 minutes. Of course, the other conditions may be employed in this process.

Although it is not clear why the continuous Ag layer is varied into Ag particle layer by the above-mentioned heat treatment, it is thought that since a surface energy of the Ag continuous layer deposited by sputtering is high, the state of Ag is varied by the heat-treatment into Ag particle state whose surface energy is lower than that of the Ag continuous layer and is stable.

Although such an Ag continuous layer can be formed by various methods such as sputtering method, vacuum deposition method, CVD (Chemical Vapor Deposition) method, thermal spraying method, and ion plating method, it will be understood that the forming method is not limited to these. However, the sputtering method is preferable in equivalency of the formed Ag particles and in productivity of the Ag layer.

As a transparent substrate, there are a glass plate, a plastic plate and a ceramic plate which has an excellent heat durability and chemical stability. As to a transparency, it is preferable that they have a light transparency as high as that of a transparent glass plate. As a preferable substrate satisfying the above specification, there are PTFE (polytetrafluoroethylene), FEP (copolymer of tetrafluoroethylene and hexafluoropropilene), PFA (copolymer of tetrafluoroethylene and perfluoroalkyl vinyl ether) are preferable in addition to a glass plate. More specifically, FEP and PFA are preferable to be employed as a substrate of the objective frequency selective plate.

As a preferable dielectric film, there are a transparent nitride film of one of AlN, $Si_3N_4$ and SiAlN and a transparent oxynitride film of one of $SiO_xN_y$ and $TiO_xN_y$. Further, as a transparent oxynitride film, a metal oxynitride constituting at least one of Cr, Zn, Zr, Sn and Ta may be employed. Although a transparent metal oxide constituted by at least one of Si, Ti, Cr, Zn, Zr, Sn and Ta may be employed, such metal oxide requires to deposit a metal sacrificial layer having a thinness ranging from several angstroms to several tens angstroms thereon in order to prevent the Ag particles from being oxidized.

The obtained frequency selective plate decreases the reflectance of radio waves concerning the frequency band of TV broadcasting, satellite broadcasting, and handy telephones while preventing radio interference noise and performs a preferable solar control property including a visible ray transparency.

The inventors of the present invention have disclosed a theoretical equation for calculating a reflectance of a frequency selective glass from the shape (size, thickness) of Ag in "Journal of Applied Physics Volume 84, Number 11, 6285–6290 (1998)". That is, the reflectance ($R_{dp}$) of the frequency selective plate is calculated from the following theoretical equation (1):

$$R_{dp}(\lambda, AR) = R_{ms}(\lambda, D) \sum_{i=1}^{m} [E_{sg}(L_i/\lambda, AR) Sr(L_i, n_i)], \quad (1)$$

where $R_{dp}$ is a reflectance, $\lambda$ is a wavelength, AR is the ratio of the area occupied by Ag (silver) particles to a total film area, $R_{ms}$ is a reflectance of silver multilayer of thickness D, D is the mean thickness of silver particles, $E_{sg}$ is a segmentation coefficient, $L_i$ is mean particle size of silver particles, Sr is the ratio of area occupied by silver particles of the particles size $L_i$, and $n_i$ is the number of silver particles of the particle size $L_i$. The segmentation coefficient $E_{sg}$ is an influence of particle size on $R_{dp}$.

With reference to the equations (2) to (13), it will be proved that the reflectance ($R_{dp}$) of the frequency selective plate according to the present invention is derived from the theoretical equation (1) and the particle size of Ag. Hereinafter, a method of deriving an electric integral equation for calculating the reflectance for the system, in which periodic arrays of perfect conductive segments are fixed on a dielectric substrate, will be discussed sequentially. First, a procedure for obtaining the segmentation coefficient $E_{sg}$ from the theoretical equation will be discussed.

(1) Current Distribution

It is assumed that both radiations from the conducting segments and the dielectric substrate contribute to the electromagnetic fields.

The geometry of periodic array and electromagnetic wave considered here is shown in FIG. 1. An infinite periodic array with periodicities a and b in the x and y directions, respectively, is fixed on a dielectric substrate. The substrate has a thickness d and a relative dielectric constant $\in_r$. The frequency selective screen is assumed to be illuminated by an incident plate wave $E_i$ propagating from the $(\theta_i, \phi_i)$ direction. $\alpha$ is a polarized angle on the $(\theta_i, \phi_i)$ plane $$E_i(x, y, z) = E_{io} \exp[-j(k_i \cdot r)], \quad (2)$$

where r is a position vector and $k_i$ is a propagation vector of the incident wave.

An electric current $J_c$ is assumed to be induced on the conductor due to the incident wave. The current is proportional to the phase of the incident wave and is expanded in a Fourier series since the structure is periodic. Therefore, the current distribution can be expressed as $$J_C(x, y) = \frac{1}{ab} \sum_{p=-\infty}^{\infty} \sum_{q=-\infty}^{\infty} \tilde{J}_{CO}(k_{xp}, k_{yq}) \cdot \exp[-j(k_{xp}x + k_{yq}y)], \quad (3)$$

where $(k_{xp}, k_{yq})$ are the wave numbers for the Floquet mode of (p,q), and $\tilde{J}_{co}(k_{xp}, k_{yq})$ is the Fourier transform of the electric current distribution $\tilde{J}_{co}(x, y)$ on the conducting element.

The fields in regions 1 ($z \geq 0$), 2 ($-d < z < 0$) and 3($z \leq -d$) are $(E_1, H_1)$, $(E_2, H_2)$, and $(E_3, H_3)$, respectively.

The boundary conditions have to be satisfied as z=0:

$$(E_1 + E_i - E_2) \times a_z = 0, \quad (4a)$$

$$a_z \times (H_1 + H_i - H_2) = \begin{cases} J_c(\text{on} \cdot \text{conductor}) \\ 0(\text{on} \cdot \text{substrate}), \end{cases} \quad (4b)$$

$$(E_1 + E_i)_{\tan} = 0 \quad (\text{on conductor}), \quad (4c)$$

z = -d:

$$(E_2 - E_3) \times a_z = 0, \quad (4d)$$

$$a_z \times (H_2 - H_3) = 0,$$

where $a_z$ is an unit vector in the z direction.

An equivalent electric current $J_i$ and an equivalent magnetic current $M_i$ which are induced on the surface of the dielectric substrate are introduced, in order to treat both the fields produced by the waves scatter from the conductors and from the surface of the dielectric substrate in a unified formulation:

$$\tilde{M}_i = \tilde{E}_i \times a_z,$$

$$\tilde{J}_i = a_z \times \tilde{H}_i. \tag{5}$$

The conductor of arbitrary shape is electrically approximated by a set of wire segments. The current distribution is expanded in a set of N piecewise sinusoidal (PWS) basis functions:

$$J_{co}(x, y) = \sum_{n=1}^{N} I_n J_n(x, y) \tag{6}$$

where $J_n$ is the n-th basis function. The moment method in the spectral domain is applied to the equation (4c). As a result, the unknown amplitude $I_n$ is solved by the following equations:

$$\sum_{n=1}^{N} Z_{mn} I_n = V_m, \qquad (m = 1, 2, \ldots, N) \tag{7}$$

$$Z_{mn} = \frac{1}{ab} \sum_p \sum_q \tilde{J}_m^*(k_{xp}, k_{yq}) \cdot \left[\tilde{K}_1(k_{xp}, k_{yq})\right] \cdot \tilde{J}_n(k_{xp}, k_{yq}),$$

$$V_m = -\tilde{J}_m^*(k_{ix}, k_{iy}) \cdot \left[E_{io} + \tilde{K}_1(k_{ix}, k_{iy}) \cdot J_{i0} + \tilde{L}_1(k_{ix}, k_{iy}) \cdot M_{io}\right],$$

where $\tilde{K}_1$ and $\tilde{L}_1$ are the dyadic Green functions for the sources of the electric magnetic currents, respectively, given by the immitance approach. The asterisk designates the complex conjugate. The current distribution $J_{co}$ on the unit cell area is determined from the equations (6) and (7).

(2) Scattered Fields (Reflected Electric Field and Reflected Magnetic Field)

An electric field radiated by induction magnetic current and induction current at the surface of scatterer is called a reflected electric field. Using the Green function, the reflected electric field on the scatter surface is given by the following equation (8):

$$E_1(x, y, z) = \frac{1}{ab} \sum_p \sum_q \tilde{K}_1(k_{xp}, k_{yp}) \cdot \tilde{J}_{co} \exp(-jk_{lpq} \cdot r) + \tag{8}$$

$$\left[\tilde{K}_1(k_{ix}, k_{iy}) \cdot J_{i0} + \tilde{L}_1(k_{ix}, k_{iy}) \cdot M_{io}\right] \exp(-jk_{li} \cdot r)$$

The reflected magnetic field $H_1$ is determined by $E_1$ using Maxwell's equation.

(3) Power Reflectance

The incident power $P_{in}$ and the reflected power $P_r$ are obtained by integrating the complex Poynting vectors over the unit cell:

$$P_{in} = (1/2) \int\int_{uc} E_i \times H_i \cdot (-a_z) dx dy \tag{9}$$

$$P_r = (1/2) \int\int_{uc} E_1 \times H_1 \cdot a_z dx dy. \tag{10}$$

Then, the power reflectance ($R_p$) is given by $$R_p = P_r / P_{in}. \tag{11}$$

Next, the distribution of particles (particle size of silver particles, ratio of area, number of particles) employed in the equation (1) will be discussed.

(4) Mean Size of Silver Particles

Generally the reflectance of the system, in which metal particles are dispersed, is proportional to the area of particles. The area factor of a given particle is defined as $S_r$ as follows:

$$S_r(l_i^2, n_i) = \frac{l_i^2 n_i}{\sum_{i=1}^{m}(l_j^2 n_j)}. \tag{12}$$

The mean particle size of Ag particles ($\bar{l}$) can be calculated as $$\bar{l} = \sum_{i=1}^{m} [l_j S_r(l_i, n_i)]. \tag{13}$$

It is preferable that the mean particle size of the Ag particles having the form of a flake is greater than or equal to 10 nm and the thickness of the Ag particles having the form of a flake is greater than or equal to 5 nm, in order to ensure the performance that the shield efficiency at near-infrared range is greater than or equal to 0.3. Troubles due to radio wave interference noise causes when the particle size of the Ag particle is greater than or equal to 0.5 mm. Therefore, it is not preferable to increase the particle size to a size greater than 0.5 mm.

Next, a method for obtaining the reflectance from the segmentation coefficient $E_{sg}$ will be discussed.

(5) Theoretical Equation of Reflectance for Silver-dispersed AlN System

Figure 2:
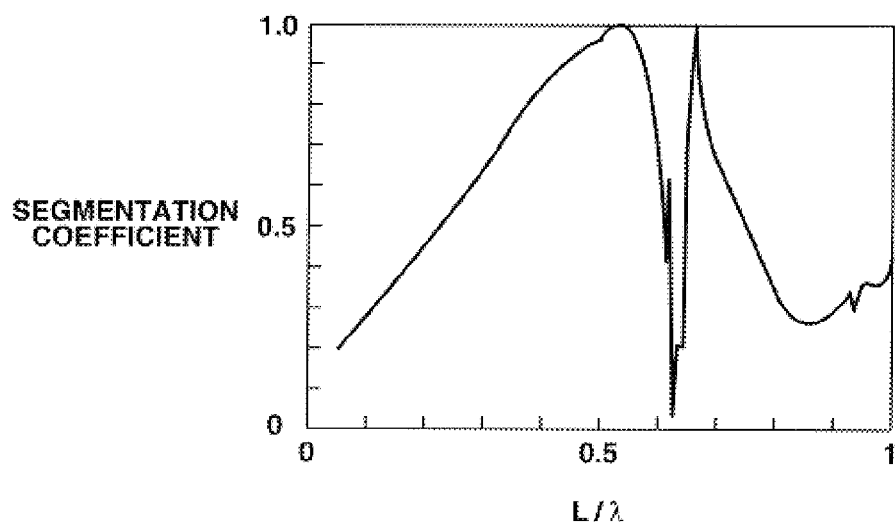
FIG. 2 is a graph showing a relationship between a segmentation coefficient at AR=22/32 and a ratio of a segment size to a wavelength of incident light.

The reflectance of the Ag layer is influenced by plasma oscillation of silver atoms. Therefore, the reflectance $R_{dp}$ of the silver-dispersed AlN layer depends on the surface resistivity $R_{sq}$, the wavelength of the incident light $\lambda$ as shown in FIG. 2, and the particle size of silver. The influence of particle size on $R_{dp}$ is expressed in terms of the segmentation coefficient $E_{sg}$.

The theoretical value of reflectance calculated by the use of the equation (11) is defined as $E_{sg}$ for the system in which periodic square segments of the perfect conductor are fixed on the AlN layer with a thickness of 40 nm. This coefficient is dependent on L/$\lambda$ and the area ratio (AR). L/$\lambda$ is the ratio of the segment size (corresponding to the particle size) to the wavelength of incident light as shown in FIG. 2. FIG. 2 shows a relationship between the segmentation coefficient ($E_{sg}$) of AR=$2^2/3^2$ and the ratio L/$\lambda$.

AR is $L^2/a^2$, the ratio of the area of the segment to that of the unit cell shown in FIG. 1. In spite of AR=$2^2/3^2$(=0.444), $E_{sg}$ in FIG. 2 approaches unit (1.0) at L/$\lambda$=0.525. This is caused by the fact that whole energies of incident waves are changed into induced currents on the unit cell area at the resonance frequency, where $R_{sq}$ of the conductor and dielectric loss of a substrate are negligibly small.

The equation (1) to obtain $R_{dp}$ will be introduced by assuming that $R_{dp}$ is equal to the product of $R_{ms}$ and $E_{sg}$. $R_{ms}$ is the reflectance of the multilayer of AlN(30 nm)/Ag(D nm)/AlN(10 nm), where D is the mean thickness of silver particles:

$$R_{dp}(\lambda, AR) = R_{ms}(\lambda, D) \sum_{i=1}^{m} [E_{sg}(L_i/\lambda, AR) Sr(l_i, n_i)], \tag{1}$$

where $$L_i = l_i (AR/AR_o)^{1/2}, \tag{14}$$

where $AR_o$ is the ratio of the area occupied by silver particles to the total film area. This ratio is calculated from FIG. 3.

Since $R_{ms}$ is a function of $R_{sq}$ and $\lambda$, and $E_{sq}$ is dependent on $L/\lambda$, the equation (1) shows that $R_{dp}$ depends on $R_{sq}$, $\lambda$, and L. The term of $\Sigma$ describes the effect of the size distribution of silver particles (Table II) on $R_{dp}$. This term is necessary because $E_{sq}$ increases nonlinearly with increasing $L/\lambda$, as shown in FIG. 2.

D and L are expressed by the equations (1) and (14) because the total weight of Ag in the AlN layer is kept constant during heating of the Ag layer:

$$D = D_o/AR, \quad (15)$$

$$L_m = \bar{l}(AR/AR_o)^{1/2}, \quad (16)$$

where $L_m$ is the mean size of the segment and $D_o$ is the thickness of Ag layer in the as deposited multilayer.

Plasma frequency of Ag resides in ultraviolet ray range, and a range called "silver window" where an extinction coefficient of Ag becomes infinitesimal resides in a lower frequency side of the plasma frequency. Therefore, the transparency of visible rays is ensured by controlling the thickness of Ag particle and the thickness of the dielectric interference film. The Ag layer is varied into a particle-dispersed state by means of heating. The particle size of Ag particles is far smaller than 0.5 mm, and it is possible to produce a glass plate having a property of selectively reflecting near-infrared lays by controlling the thickness of the Ag layer and the heat treatment conditions.

First Embodiment

The frequency selective plate having radio wave transparent property was prepared by coating a glass plate with an AlN/Ag/AlN multilayered film by dc magnetron sputtering.

(1) In sputtering, the target-substrate distance was kept at 90 mm. Before sputtering, the vacuum chamber was evacuated to $2 \times 10^{-4}$ Pa.

(2) The bottom AlN layer was deposited with reactive sputtering by using a pure Al target (129 mm diameter, 10 mm thick). The rectangular pulse wave with a frequency of 10 kHz was supplied to the cathode in order to prevent irregular discharge. During sputtering, the pressure of the mixed gas was controlled at 0.7 Pa by adjusting the flow rate ratio $N_2/Ar$ to 20/80.

(3) The intermediate Ag layer was deposited by using a pure Ag target (129 mm diameter, 5 mm thick) at an argon gas pressure of 0.7 Pa.

(4) When the as-deposited AlN/Ag layers were heat treated in the sputtering vacuum chamber at $2 \times 10^{-4}$ Pa and 200° C. before deposition of the top AlN layer, the Ag layer was changed into particles dispersed in AlN film.

(5) The top AlN layer was deposited with reactive sputtering by using a pure Al target (129 mm diameter, 10 mm thick), in a manner as same as that of the step (2) for the bottom AlN layer.

As to the sample of glass-substrate/AlN layer/Ag layer obtained by the steps (1) to (3) and the steps (1) to (4), the size distribution of Ag particles was measured by the following method.

A. Size Distribution of Silver Particles

Figure 3:
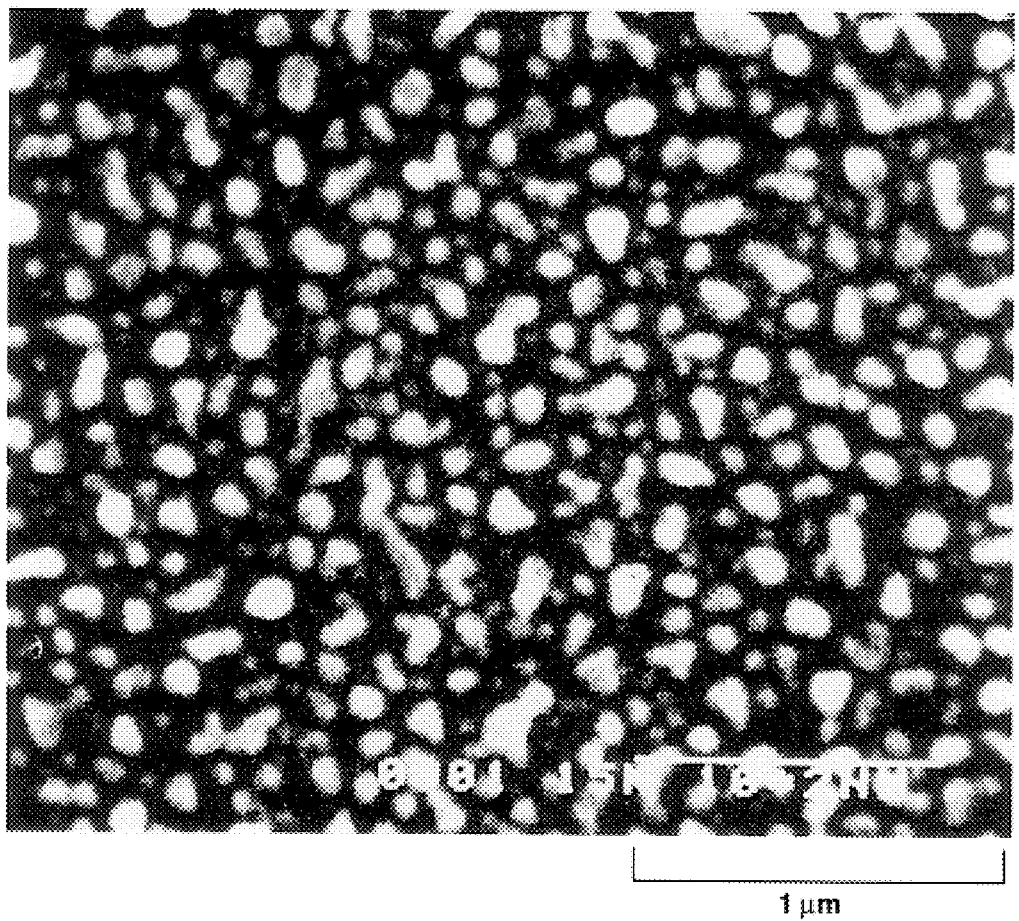
FIG. 3 is a view showing a SEM micrograph of a Ag-dispersed AlN film.

FIG. 3 shows a surface of the sample of the glass substrate/AlN layer/Ag layer obtained by executing the steps (1) to (4), which sample was searched by scanning electron microscopy (SEM) using a Hitachi S-415.

Particle sizes, calculated from FIG. 3 by the Martin method, are shown in Table I. The area ratio, which is defined as the ratio of the area occupied by silver particles to the total file area, was 0.20. By substituting the mean particle size (l) and the number (n) of the particles into the equations (12) and (13), 87 nm was obtained as the mean particle size. The particle size distribution is shown in Table II as a function of Sr.

The surface of the sample of the glass substrate/AlN layer/Ag layer obtained by executing the steps (1) to (4) was searched by atomic force microscopy (AFM) using a Seiko SPA-250. As a result, the mean particle size of the sample was 168 nm and the area ratio of the sample was 0.38.

TABLE I

| Particle size (nm) | Numbers of particles/nm² |
| --- | --- |
| 29–40 | $2.7 \times 10^{-6}$ |
| 41–52 | $5.9 \times 10^{-6}$ |
| 53–64 | $5.2 \times 10^{-6}$ |
| 65–76 | $6.2 \times 10^{-6}$ |
| 77–88 | $5.6 \times 10^{-6}$ |
| 89–100 | $2.9 \times 10^{-6}$ |
| 101–112 | $2.9 \times 10^{-6}$ |
| 113–124 | $2.7 \times 10^{-6}$ |

TABLE II

| $l_i/\bar{l}$ | $S_r(l_i, n_i)$ |
| --- | --- |
| 0.404 | 0.017 |
| 0.539 | 0.066 |
| 0.673 | 0.091 |
| 0.808 | 0.156 |
| 0.943 | 0.190 |
| 1.08 | 0.128 |
| 1.21 | 0.162 |
| 1.35 | 0.190 |

B. Orientation of Crystals

As to the sample obtained by executing the steps (1) to (3) and the steps (1) to (4), the orientation of crystals was evaluated. Crystalline phases found in the sample were studied by x-ray diffraction (XRD) with a Rigaku RINT-1500 using Cu Kα radiation.

As a result of the x-ray diffraction (XRD) analyses, the Ag layer of the sample of glass-substrate/AlN/Ag obtained by the steps (1) to (3) contained polycrystalline silver with an Ag(111) plane parallel to the substrate. The intensity of the diffraction peak of the Ag(200) plane increased appreciably when the Ag layer changed to discrete particles with heat treatment as shown in FIG. 3. Table II shows that the lattice distance of the Ag(111) plane decreases from 236.6 to 235.9 pm as a result of heating for 2 h. The half height width of the peak also decreased.

TABLE III

| Heating time (h) | Lattice distance of Ag(111) plane (pm) | Peak intensity | Half width (deg.) |
| --- | --- | --- | --- |
| 0 | 236.6 | 2.761 | 0.928 |
| 1 | 236.0 | 7.113 | 0.789 |
| 2 | 235.9 | 7.417 | 0.403 |

Remarks: The value of the lattice distance of Ag(111) plane shown in No. 4-97883 of X-Ray Power Data File published by ATSM is 235.9 pm.

C. Reflectance

Figure 4:
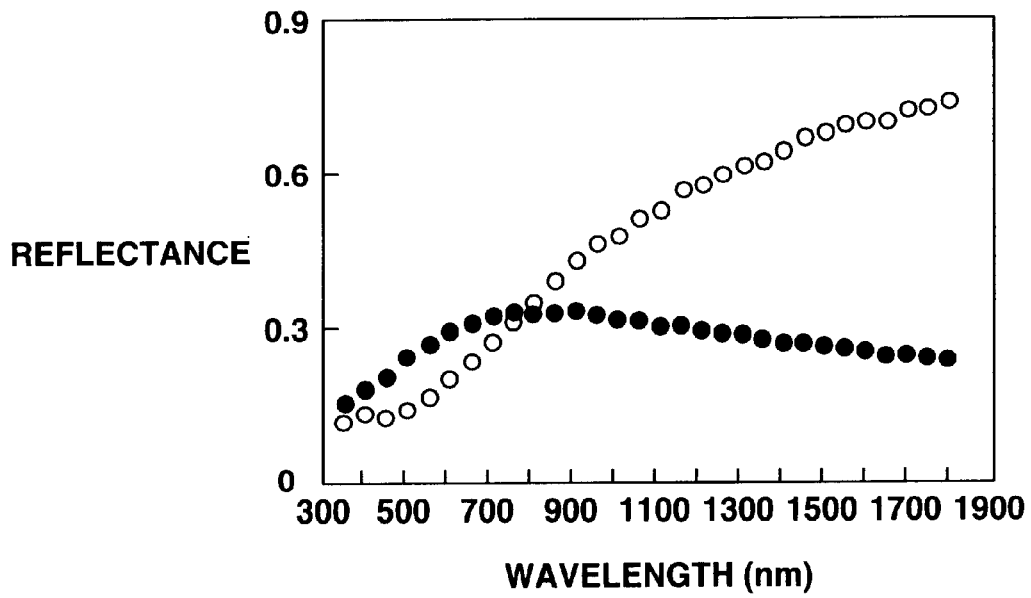
FIG. 4 is a graph showing a comparison of spectra reflectance of heat-treated (●) and as-deposited (○) AlN/Ag/AlN/glass samples.

Reflectance spectra of a sample just produced (as-deposited) by executing the steps (1) to (3) and a sample produced by executing the steps (1) to (4) were measured from 350 to 1800 nm at room temperature using a Hitachi 340 spectrophotometer. The obtained result is shown in FIG. 4.

Figure 5:
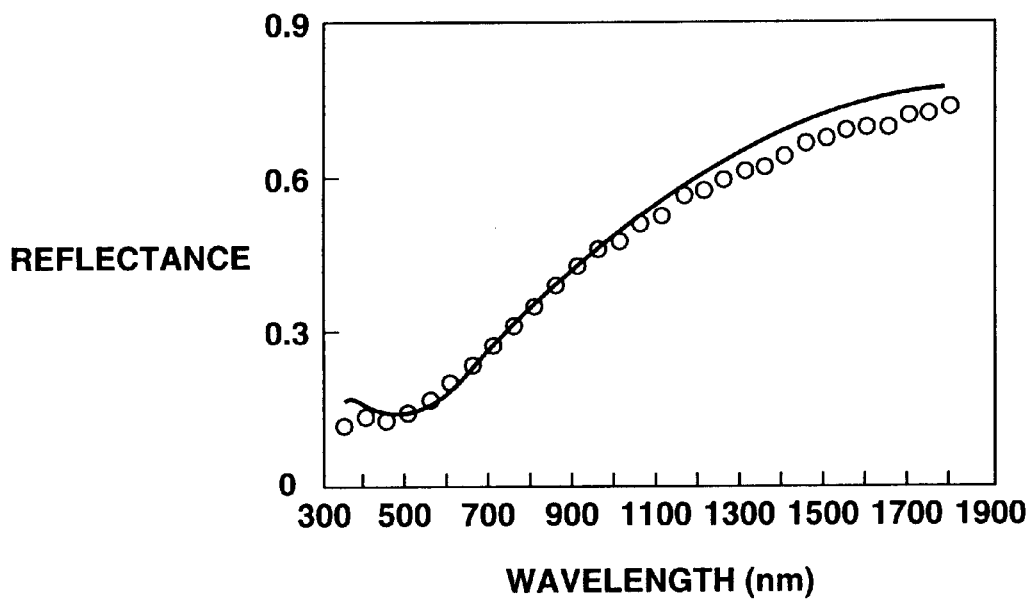
FIG. 5 is a graph showing comparison of experimental (○) and theoretical (-) reflective spectra of as-deposited samples.

First, as to the former sample just deposited (as-deposited) by executing the step (3), a characteristic curve of the reflectance of the sample was obtained. FIG. 5 shows a comparison of the measured vales (○) and the theoretical valve (–) of the reflection spectra. As is apparent from FIG. 5, when the thickness of the as-deposited Ag layer is equal to 8 nm, the values calculated using the matrix method of the four terminals is in fair agreement with the observed curve.

On the other hand, the size of the crystallites in the as-deposited Ag layer was 10 nm. This calculation was made by substituting the half height width of the Ag(111) peak shown in Table II into Scherrer's equation. It is seen that the thickness of the Ag layer is equal to the crystallite size. These indicate that this layer consists of polycrystalline silver with Ag(111) planes parallel to the substrate.

$$CT = \frac{\lambda}{\Delta(2\theta)\cos\theta} \quad (17)$$

where CT is the thickness of crystal (Å), λ is the wavelength of the radiation X-rays (Å), Δ(2θ) is the half height width (radian), and θ is the incident angle of X-rays.

The reflection spectra of heat-treated and as-deposited sample accomplished by the execution of the step (4) is shown in FIG. 4. It is seen that heating of the Ag layer increases the reflectance for the wavelength of incident lights shorter than 780 nm, and decreases the reflectance of those longer than 780 nm. This phenomenon will be caused by the dispersion of the Ag particles whose size is smaller than the wavelength of the incident lights.

Figure 6:
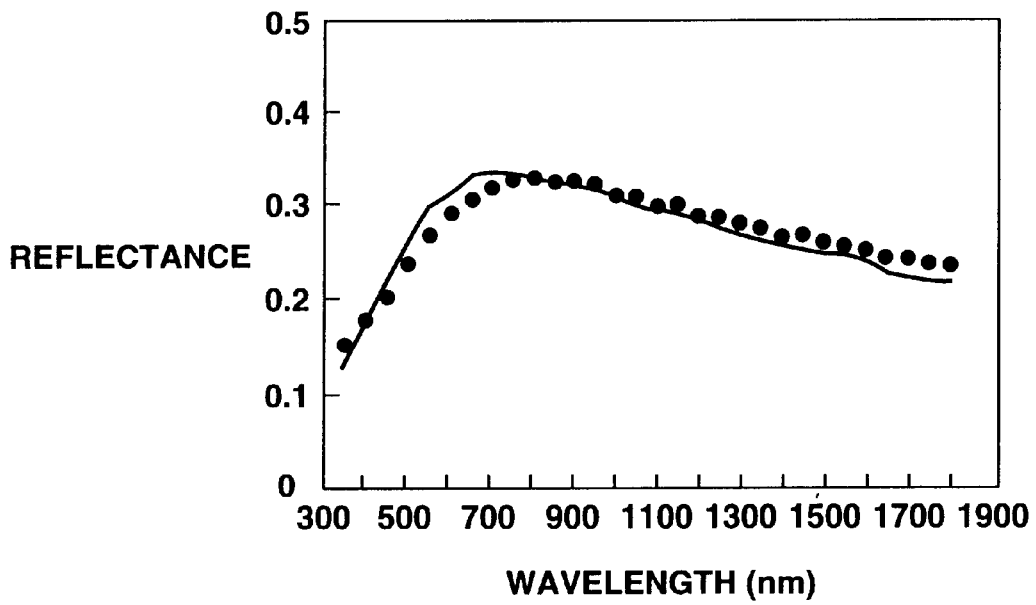
FIG. 6 is a graph showing comparison of experimental (●) and theoretical (-) reflective spectra of an Ag dispersed AlN film of FIG. 7 is a graph showing a relationship between shielding effect and mean segment size

The curve shown in FIG. 6 is a theoretical curve of the reflectance of the frequency selective film having a property of the silver particles of the area mean size 130 nm, the thickness of 18 nm and the area ratio 0.444, ranging from 359 nm to 1800. This theoretical curve was derived from the theoretical equation (1) and corresponds well with the actual value of the first embodiment shown by black circular marks in FIG. 6. In contrast, the mean size measured by SEM was smaller than the theoretical value as shown in Table IV. This difference will be caused by estimating the silver particle size too small in the search by SEM. That is, since the intensity of secondary electrons scattered from the periphery of the particle of about 3 nm thick is weak, SEM cannot detect the scattered secondary electrons scattered from the periphery of the particle as a periphery of the particle. The theoretical thickness of the silver particle corresponds well with the measured value by XRD. Therefore, it is concluded that the theoretical equation (1) is valid.

TABLE IV

|  | Mean size of Ag particles (nm) | Mean thickness of Ag particles (nm) | Area ratio |
|---|---|---|---|
| Theoretical | 130 | 18 | 0.444 |
| Observed (SEM) | 87 | — | 0.2 |
| (AFM) | 168 | — | 0.38 |
| (XRD) | — | 23 | — |

Remarks: Mean thickness of crystalline Ag particles was estimated using Scherrer's equation and the half width shown in Table III.

Second Embodiment

Since the validity of the theoretical equation (1) is proved in the first embodiment, adaptive size of the silver particle to frequency selective film is obtained from the theoretical equation (1). First, the shield effect (Es) of the silver particle system is defined by the following equation (18):

$$E_s = \frac{\sum_{\lambda=680}^{1800} [R_{dp}(\lambda) I_{sr}(\lambda)]}{\sum_{\lambda=680}^{1800} [I_{sr}(\lambda)]}, \quad (18)$$

where λ is a wavelength of incident ray to the frequency selective plate, $R_{dp}$ is a reflectance of the frequency selective plate, and $I_{sr}$ is an intensity of solar radiation at air-mass=1.

Figure 7:
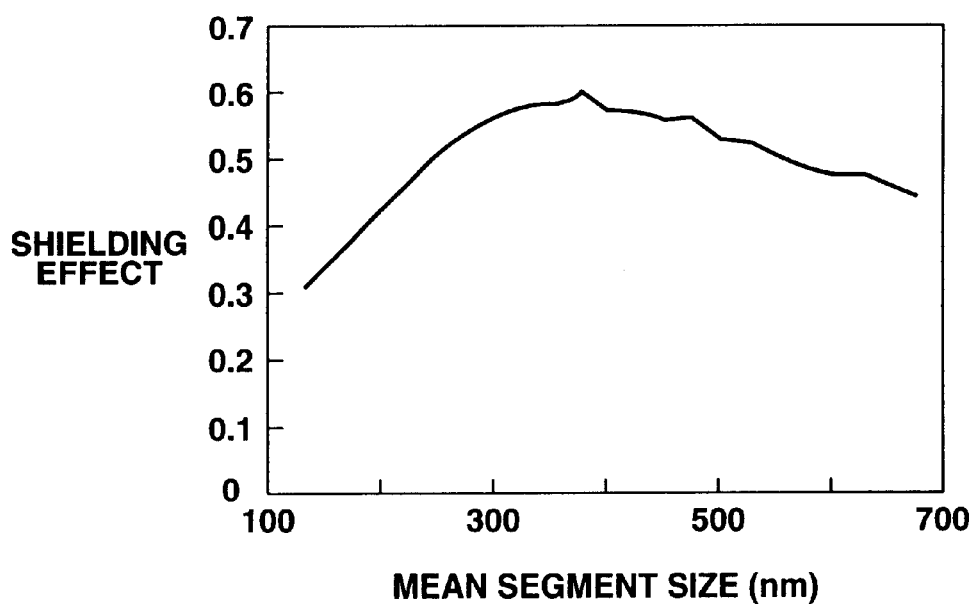

The maximum shielding effect of the present silver particles system is calculated by the equation (1) for AR=0.444 and $D_o$=8 nm, assuming that Sr in the equation (1) is constant for various mean sizes of segments ($L_m$). The maximum shielding effect is obtained at $L_m$=375 as shown in FIG. 7, even when the transparence is kept through visible and radio wave regions for solar control glasses.

Figure 8:
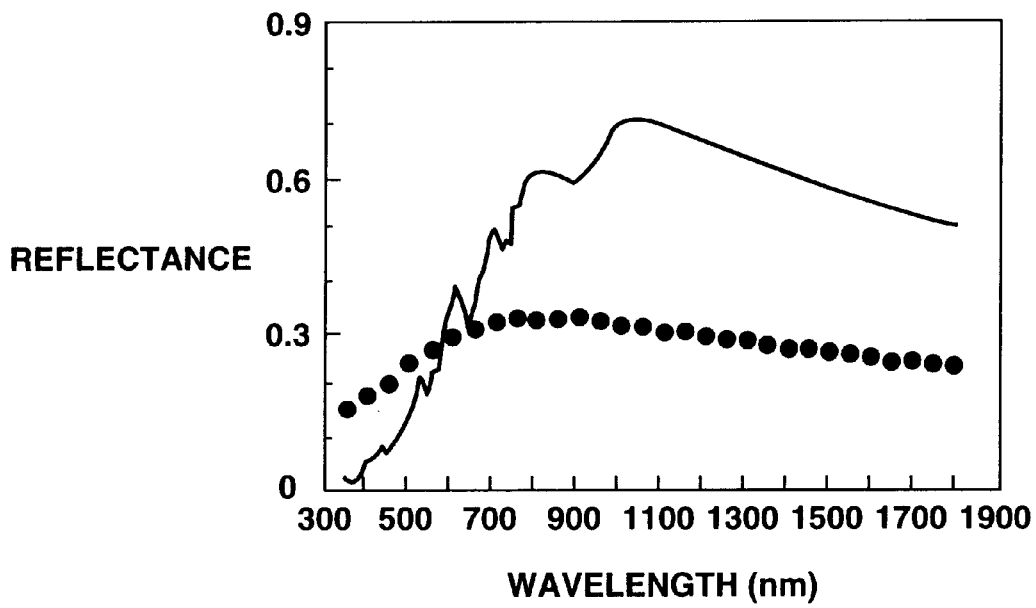
FIG. 8 is a graph showing comparison of theoretical reflective spectra (-) at Lm=375 nm and experimental reflective spectra (●) at Lm=130 nm for Ag-dispersed AlN film.

The theoretical curve of reflective spectra at $L_m$=375 nm is shown in FIG. 8. In FIG. 8, a continuous line denotes a theoretical reflection spectra of 375 nm of the silver particle dispersed AlN film, and black circular marks (●) denote the measured reflection spectra at $L_m$=130 nm. The theoretical valve is calculated from the equation (1) assuming that AR=$2^2/3^2$, $L_t$=18 nm.

The position of maximum reflectance shifts to longer wavelengths by increasing $L_m$=$L_t$ from 130 to 375 nm. This suggests that the frequency selective screen which reflects only near-infrared rays can be designed by controlling the size of the silver particles. Theoretical values of reflectance sharply decrease at several wavelengths below 800 nm. These phenomena are attributed to grating lobes and occur at L/λ=0.626 in the case of FIG. 2, since the segments are periodic.

Tables V and VI show the theoretical shielding coefficient of near-infrared rays range and the dependency of the transparency of visible lights to the thickness of the silver particles as to the frequency selective glass in the case that the area mean size of the silver particle is 375 nm, as representative examples. In Table V, 0.444 was employed as the representative area ratio, and in Table VI, 0.826 was employed. From Tables V and VI, it is found that it is necessary for the thickness of the silver particles to be greater than or equal to 5 nm in order to ensure the shield coefficient of near-infrared rays range greater than or equal to 0.3. On the other hand, when the thickness of the silver particles becomes greater than 30 nm, the shield coefficient is saturated while having the transparency of visible lights.

The thickness of the silver particles obtained from the equation (17) of the Scherrer's equation is inverse proportion to the half height width of the diffraction peak of Ag(111) plane. Therefore, the measurement Limit of the particle thickness is determined by the detection limit of the half height width. The limit value in the present x-ray diffraction apparatus is about 0.01 degree. If the limit valve 0.01 is substituted into the equation (17), 1 μm is obtained as a limit value of the thickness. That is, it is possible to adapt the Scherrer's equation only if the thickness of silver particle is smaller than or equal to 1 μm. Accordingly, the preferable thickness of the silver particle should be within a range 5 nm to 1 μm. The wavelength of Cu Kα radiation X-ray was 1.5405 (Å), the incident angle of X-ray corresponding Ag(111) plane is 38.12/2 degrees.

TABLE V

| Thickness of Ag particles (nm) | Shielding effect of near-infrared rays | Transparency at $\lambda = 550$ nm (%) |
| --- | --- | --- |
| 2 | 0.11 | 90 |
| 5 | 0.27 | 82 |
| 10 | 0.48 | 64 |
| 20 | 0.64 | 36 |
| 30 | 0.69 | 24 |
| 50 | 0.71 | 17 |
| 100 | 0.71 | 15 |

Remarks: Area mean size of silver particles: 375 nm Area ratio of silver particles: 0.444

TABLE VI

| Thickness of Ag particles (nm) | Shielding effect of near-infrared rays | Transparency at $\lambda = 550$ nm (%) |
| --- | --- | --- |
| 2 | 0.14 | 88 |
| 5 | 0.36 | 79 |
| 10 | 0.62 | 57 |
| 20 | 0.82 | 25 |
| 30 | 0.88 | 11 |
| 50 | 0.91 | 3 |
| 100 | 0.91 | 1 |

Remarks: Area mean size of silver particles: 375 nm Area ratio of silver particles: 0.826

Tables VII and VIII show calculation results of the area mean particle-size dependency as to the shield efficiency of near-infrared rays and the visible rays transparency of the frequency selective glass having a silver particle layer of 20 nm thickness. The calculation results were derived from the theoretical equation (1). As is apparent from Tables VII and VIII, it is necessary that the particle size of the sliver particle is greater than or equal to 100 nm in order to ensure the shield efficiency of near-infrared rays greater than 0.3. Although the increase of the shield efficiency is caused by the increase of the particle size, the decrease of the shield efficiency is caused by the further increase of the particle size to be greater than a predetermined size though the predetermined size is different in each area ratio. The shield efficiency is kept to be greater than 0.3 even if the particle size is increased. However, if the particle size is greater than or equal to 1/20 of the shortest wavelength of commonly used satellite broadcasting waves, radio wave interference noise is generated. Therefore, it is preferable that the particle size of the silver particle is smaller than or equal to 0.5 mm.

TABLE VII

| Area mean size of Ag particles (nm) | Shielding effect of near-infrared rays | Permeability (Transmittance) at $\lambda = 550$ nm (%) |
| --- | --- | --- |
| 50 | 0.16 | 43 |
| 100 | 0.27 | 33 |
| 200 | 0.47 | 26 |
| 300 | 0.62 | 30 |
| 500 | 0.58 | 36 |
| 700 | 0.47 | 36 |

Remarks: Thickness of Ag particles: 20 nm Area ratio of Ag particles: 0.444

TABLE VIII

| Area mean size of Ag particles (nm) | Shielding effect of near-infrared rays | Permeability (Transmittance) at $\lambda = 550$ nm (%) |
| --- | --- | --- |
| 50 | 0.28 | 34 |
| 100 | 0.43 | 28 |
| 200 | 0.61 | 25 |
| 300 | 0.72 | 25 |
| 500 | 0.81 | 25 |
| 700 | 0.82 | 25 |

Remarks: Thickness of Ag particles: 20 nm Area ratio of Ag particles: 0.826

Third Embodiment

The Frequency selective plate having radio wave transmitting (transparent) property was prepared by coating a substrate glass with a $SiO_xN_y/Ag/SiO_xN_y$ multilayered film by dc magnetron sputtering.

(1) In sputtering, the target-substrate distance was kept at 90 mm. Before sputtering, the vacuum chamber was evacuated to $2 \times 10^{-4}$ Pa.

(2) The bottom $SiO_xN_y$ layer was deposited with RF reactive sputtering by using a $SiO_2$ target (76 mm diameter, 5 mm thick). $N_2$ gas was employed as reactivity gas. During sputtering, the pressure of $N_2$ gas was controlled at 1.0 Pa by controlling the flow rate of $N_2$ gas.

(3) The glass substrate/$SiO_xN_y$ layer was heated in the vacuum chamber and kept at 250° C.

(4) The intermediate Ag layer was deposited by using a pure Ag target (76 mm diameter, 5 mm thick) at an argon gas pressure of 1.0 Pa.

(5) The top $SiO_xN_y$ layer was deposited with reactive sputtering by using a pure $SiO_2$ target (76 mm diameter, 5 mm thick), in a manner as same as that of the step (2) for the bottom $SiO_xN_y$ layer.

As to the sample of glass-substrate/$SiO_xN_y$ layer/Ag layer/$SiO_xN_y$ layer obtained by executing the steps (1) to (5), the radio-wave transparency, the mean size of Ag particles, the means thickness and the reflectance were measured by the following method.

A. Radio-wave Transparency

The surface resistivity (Ω/sq) of the sample obtained by executing the steps (1) to (5) was measured by a surface resistivity measuring apparatus (MEGARESTA H0709) of Sisido Electric Company. The measurement value of the sample was greater than or equal to $9.9 \times 10^{12}$ Ω/sq which indicates that the sample sufficiently satisfies the radio-wave transparency.

B. Size Distribution of Silver particles

A surface of the sample of the glass-substrate/$SiO_xN_y$/Ag/$SiO_xN_y$ obtained by executing the steps (1) to (4) was searched by field emission type scanning electron microscope (FE-SEM) using a Hitachi S-4500. The obtained image was analyzed by an image analysis software "Image-Pro PLUS" of Cybemetics Company. As a result, the mean particle size was 350 nm, and the area ratio was 0.74.

C. Mean Thickness of Silver Particles

As to the sample obtained by executing the steps (1) to (5), the orientation of crystals was evaluated. Crystalline phases found in the sample were studied by x-ray diffraction (XRD) with a Rigaku RINT-1500 using Cu Kα radiation. On the basis of a result of the x-ray diffraction (XRD) analyses, the thickness of the crystalline phases in the silver layer as just produced was obtained by substituting the half height width of Ag(111) peak into the Scherrer's equation (17). The obtained value of the thickness was 28 nm.

D. Reflectance

Figure 9:
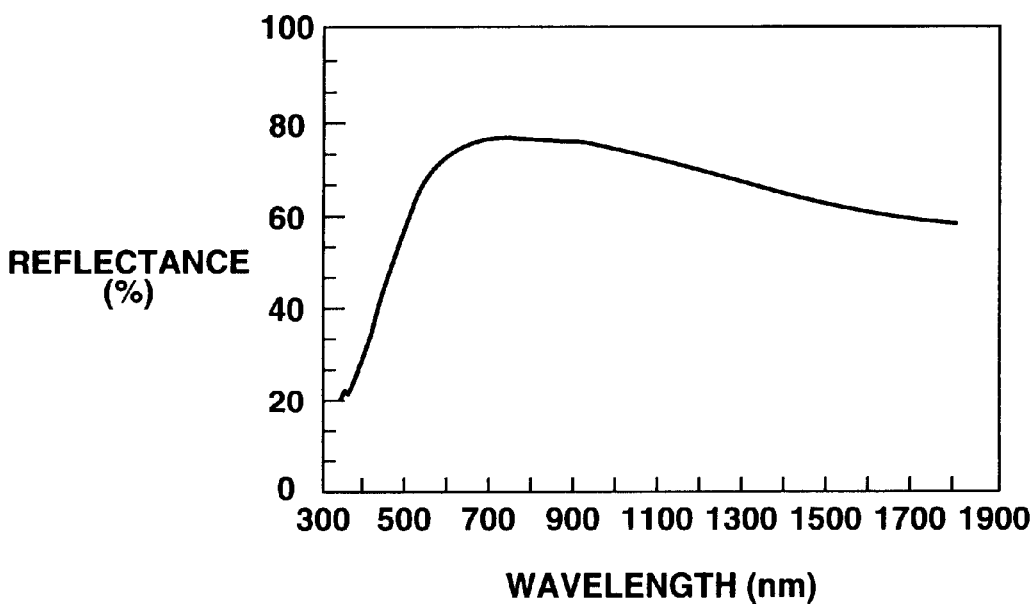
FIG. 9 is a graph showing reflective spectra of a frequency selective plate of a third embodiment.

Reflectance spectra of a sample just produced by executing the steps (1) to (5) was measured from 340 to 1800 nm at room temperature using a Hitachi U-4000 spectrophotometer. As shown in FIG. 9, the reflectance at the wavelength 730 nm was 77%. The value is very high and will be due to the execution of the step (4) for varying the Ag layer into particles.

Fouth Embodiment

The frequency selective plate having radio wave transparent property was prepared by coating a substrate glass with a $TiO_xN_y/Ag/TiO_xN_y$ multilayered film by dc magnetron sputtering.

(1) In sputtering, the target-substrate distance was kept at 90 mm. Before sputtering, the vacuum chamber was evacuated to $2\times10^{-4}$ Pa.

(2) The bottom $TiO_xN_y$ layer was deposited with DC reactive sputtering by using a Ti target (76 mm diameter, 5 mm thick). During sputtering, the pressure of the mixed gas was controlled at 1.0 Pa by adjusting the flow rate ratio $N_2/O_2$ to 80/20.

(3) The glass substrate/$TiO_xN_y$ layer was heated in the vacuum chamber and kept at 250° C.

(4) The first Ag layer was deposited on the heated glass substrate/$TiO_xN_y$ layer by using a pure Ag target (76 mm diameter, 5 mm thick) at an argon gas pressure of 1.0 Pa.

(5) After the deposition of the first Ag layer, the temperature of the glass substrate was cooled at a room temperature.

(6) The second Ag layer was deposited on the heated glass substrate/$TiO_xN_y$ layer/first Ag layer cooled at the room temperature, in a manner as same as that of the step (4).

(7) After the deposition of the second Ag layer, the glass substrate/$TiO_xN_y$ layer/first Ag layer/second Ag layer was heat-treated at 200° C. for 2 hours.

(8) The top $TiO_xN_y$ layer was deposited with reactive sputtering by using a pure Ti target (76 mm diameter, 5 mm thick), in a manner as same as that of the step (2) for the bottom $TiO_xN_y$ layer.

As to the sample of glass-substrate/$TiO_xN_y$ layer/first Ag layer/second Ag layer/$TiO_xN_y$ layer obtained by executing the steps (1) to (8), the radio-wave transparency, the mean size of Ag particles, the means thickness and the reflectance were measured by the methods as same as those in the third embodiment.

A. Radio-wave Transparency

The surface resistivity (Ω/sq) of the sample obtained by executing the steps (1) to (8) was greater than or equal to $9.9\times10^{12}$ Ω/sq which indicates that the sample sufficiently satisfies the radio-wave transparency.

B. Size Distribution of Silver Particles

A surface of the sample of the glass-substrate/$TiO_xN_y$ layer/first Ag layer/second Ag layer obtained by executing the steps (1) to (7) was searched by the same method as that of the third embodiment and analyzed by the same method as that of the third embodiment. As a result, the mean particle size was 375 nm, and the area ratio was 0.79.

C. Mean Thickness of Silver Particles

As to the sample obtained by executing the steps (1) to (8), the orientation of crystals was evaluated. Crystalline phases found in the sample were studied by x-ray diffraction (XRD) with a Rigaku RINT-1500 using Cu Kα radiation. On the basis of a result of the x-ray diffraction (XRD) analyses, the thickness of the crystalline phases in the silver layer as just produced was obtained by substituting the half height width of Ag(111) peak into the Scherrer's equation (17). The obtained value of the thickness was 32 nm.

D. Reflectance

Figure 10:
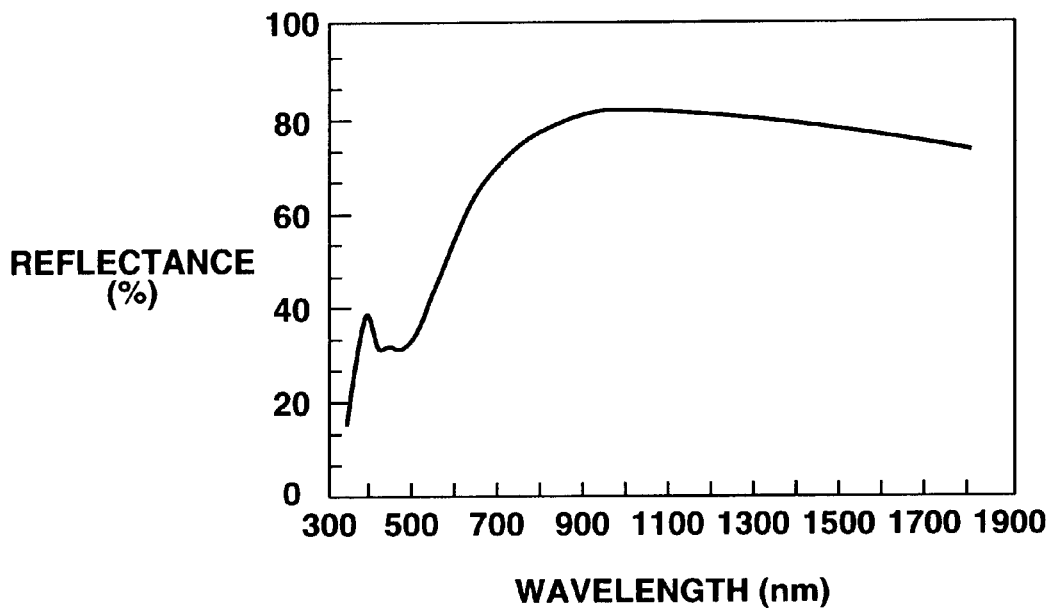
FIG. 10 is a graph showing reflective spectra of a frequency selective plate of a fourth embodiment.

Reflectance spectra of the sample just produced by executing the step (8) was measured from 340 to 1800 nm at room temperature using a Hitachi U-4000 spectrophotometer. As shown in FIG. 10, the reflectance at the wavelength 900 nm was 82%. The value is very high and will be caused because equivalent Ag particles to become cells are formed by depositing the first Ag layer on the heated substrate, and further a second Ag layer is deposited on the first Ag layer and is heated so that the Ag cells become large.

Fifth Embodiment

The frequency selective plate having radio wave transparent property was prepared by coating a glass substrate with an AlN/Ag/AlN $SiO_xN_y/Ag/SiO_xN_y$ multilayered film by dc magnetron sputtering.

(1) In sputtering, the target-substrate distance was kept at 90 mm. Before sputtering, the vacuum chamber was evacuated to $2\times10^{-4}$ Pa.

(2) The bottom AlN layer was deposited with RF reactive sputtering by using an Al target (76 mm diameter, 5 mm thick). $N_2$ gas was employed as reactivity gas. During sputtering, the pressure of $N_2$ gas was controlled at 1.0 Pa by controlling the flow rate of $N_2$ gas.

(3) The glass substrate/AlN layer was heated in the vacuum chamber and kept at 250° C.

(4) The intermediate Ag layer was deposited on the heated glass substrate/AlN layer by using a pure Ag target (76 mm diameter, 5 mm thick) at an argon gas pressure of 1.0 Pa.

(5) The top AlN layer was deposited with reactive sputtering by using an Al target (76 mm diameter, 5 mm thick), in a manner as same as that of the step (2) for the bottom AlN layer.

As to the sample of glass-substrate/AlN layer/Ag layer/AlN layer obtained by executing the steps (1) to (5), the radio-wave transparency, the mean size of Ag particles, the means thickness and the reflectance were measured by the methods as same as those employed in the third embodiment.

A. Radio-wave Transparency

The surface resistivity (Ω/sq) of the sample obtained by executing the steps (1) to (5) was measured by a surface resistivity measuring apparatus (MEGARESTA H0709) of Sisido Electric Company. The measurement value of the sample was greater than or equal to $9.9\times10^{12}$ Ω/sq which indicates that the sample sufficiently satisfies the radio-wave transparency.

B. Size Distribution of Silver Particles

A surface of the sample of the glass-substrate/$SiO_xN_y$/Ag/$SiO_xN_y$ obtained by executing the steps (1) to (4) was searched by field emission type scanning electron microscope (FE-SEM) using a Hitachi S-4500. The obtained image was analyzed by an image analysis software "Image-Pro PLUS" of Cybemetics Company. As a result, the mean particle size was 335 nm, and the ratio of the area was 0.78.

C. Mean Thickness of Silver Particles

As to the sample obtained by executing the steps (1) to (5), the orientation of crystals was evaluated. Crystalline phases found in the sample were studied by x-ray diffraction (XRD) with a Rigaku RINT-1500 using Cu Kα radiation. On the basis of a result of the x-ray diffraction (XRD) analyses, the thickness of the crystalline phases in the silver layer as just produced was obtained by substituting the half height width of Ag(111) plane peak into the Scherrer's equation (17). The obtained value of the thickness was 27 nm.

D. Reflectance

Figure 11:
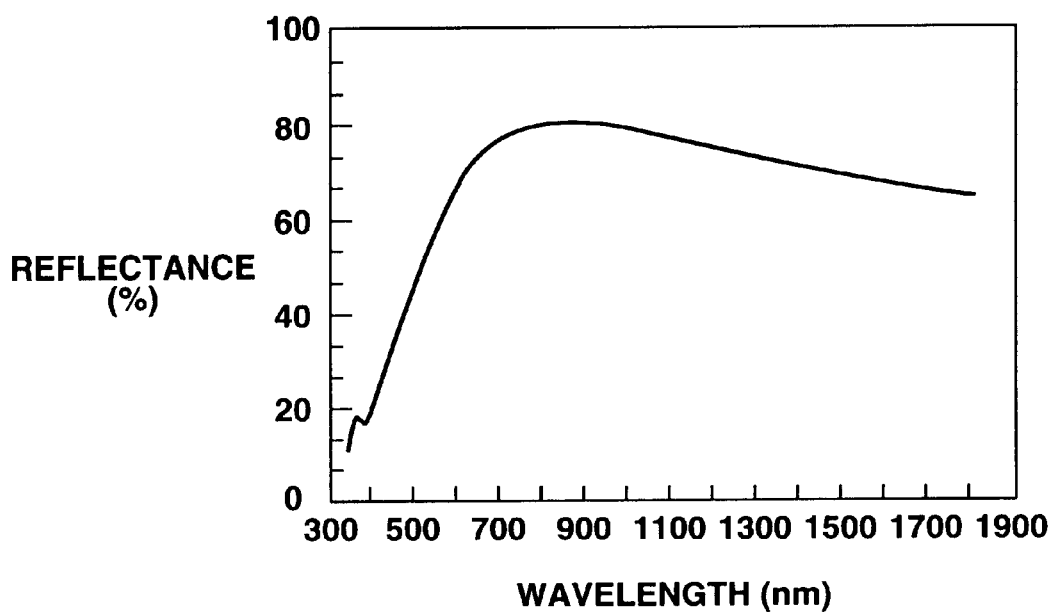
FIG. 11 is a graph showing reflective spectra of a frequency selective plate of a fifth embodiment.

Reflectance spectra of a sample just produced by executing the steps (1) to (5) was measured from 340 to 1800 nm at room temperature using a Hitachi U-4000 spectrophotometer. As shown in FIG. 11, the reflectance at the wavelength 850 nm was 80%. The value is very high and will be due to the execution of the step (4) for depositing the Ag continuous layer and varying the Ag layer into Ag particles.

Sixth Embodiment

The frequency selective plate having radio wave transparent property was prepared by coating a glass substrate with an AlN/Ag/AlN multilayered film by dc magnetron sputtering.

(1) In sputtering, the target-substrate distance was kept at 90 mm. Before sputtering, the vacuum chamber was evacuated to $2\times10^{-4}$ Pa.

(2) The bottom AlN layer was deposited with dc reactive sputtering by using an Al target (76 mm diameter, 5 mm thick). During sputtering, the pressure of the $N_2$ gas was controlled at 1.0 Pa by controlling the flow rate of $N_2$ gas.

(3) The glass substrate/AlN layer was heated in the vacuum chamber and kept at 250° C.

(4) The first Ag layer was deposited on the heated substrate by using a pure Ag target (76 mm diameter, 5 mm thick) at an argon gas pressure of 1.0 Pa.

(5) After the deposition of the first Ag layer, the temperature of the glass substrate was cooled at a room temperature.

(6) The second Ag layer was deposited on the glass substrate cooled at the room temperature, in a manner as same as that of the step (4).

(7) After the deposition of the second Ag layer, the glass substrate/first Ag layer/second Ag layer was heat-treated at 200° C. for 2 hours in the vacuum chamber evacuated to $2\times10^{-4}$ Pa.

(8) The top AlN layer was deposited with reactive sputtering by using an Al target (76 mm diameter, 5 mm thick), in a manner as same as that of the step (2) for the bottom AlN layer.

As to the sample of glass-substrate/AlN layer/first Ag layer/second Ag layer/AlN layer obtained by executing the steps (1) to (8), the radio-wave transparency, the mean size of Ag particles, the means thickness and the reflectance were measured by the methods as same as those in the third embodiment.

A. Radio-wave Transparency

The surface resistivity (Ω/sq) of the sample obtained by executing the steps (1) to (8) was greater than or equal to $9.9\times10^{12}$ Ω/sq which indicates that the sample sufficiently satisfies the radio-wave transparency.

B. Size Distribution of Silver Particles

A surface of the sample of the glass-substrate/AlN layer/first Ag layer/second Ag layer obtained by executing the steps (1) to (7) was searched by the same method as that of the third embodiment and analyzed by the same method as that of the third embodiment. As a result, the mean particle size was 350 nm, and the area ratio was 0.74.

C. Mean Thickness of Silver Particles

As to the sample obtained by executing the steps (1) to (8), the orientation of crystals was evaluated. Crystalline phases found in the sample were studied by x-ray diffraction (XRD) with a Rigaku RINT-1500 using Cu Kα radiation. On the basis of a result of the x-ray diffraction (XRD) analyses, the thickness of the crystalline phases in the silver layer as just produced was obtained by substituting the half height width of Ag(111) plane peak into the Scherrer's equation (17). The obtained value of the thickness was 28 nm.

D. Reflectance

Figure 12:
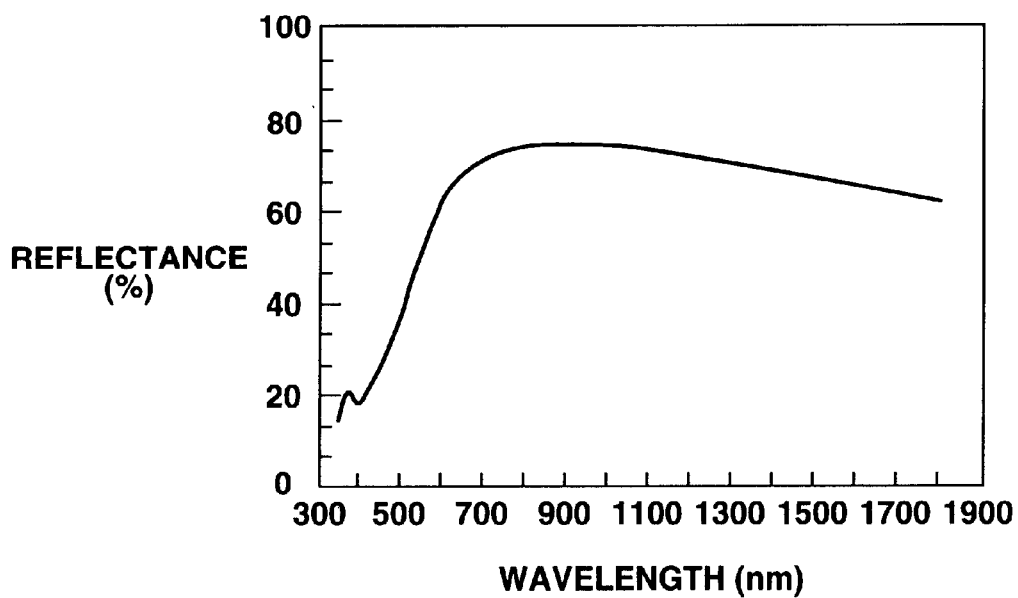
FIG. 12 is a graph showing reflective spectra of a frequency selective plate of a sixth embodiment.

Reflectance spectra of the sample just produced by executing the steps (1) to (8) was measured from 340 to 1800 nm at room temperature using a Hitachi U-4000 spectrophotometer. As shown in FIG. 12, the reflectance at the wavelength 950 nm was 73%. The value is very high and will be caused because equivalent Ag particles to become cells are formed by depositing the first Ag layer on the heated substrate, and further a second Ag layer is deposited on the first Ag layer and is heated so that the Ag cells become large.

Seventh Embodiment

The frequency selective plate having radio wave transparent property was prepared by coating a substrate with an AlN/Ag/AlN multilayered film by dc magnetron sputtering. PFA (copolymer of tetrafluoroethylene and perfluoralkoxy) substrate of 1 mm thick was employed as a transparent substrate. PFA resin is a transparency similar to that of a glass and is chemically stable.

(1) In sputtering, the target-substrate distance was kept at 90 mm. Before sputtering, the vacuum chamber was evacuated to $2\times10^{-4}$ Pa.

(2) The bottom AlN layer was deposited with DC reactive sputtering by using an Al target (76 mm diameter, 5 mm thick). $N_2$ gas was employed as reactivity gas. During sputtering, the pressure of $N_2$ gas was controlled at 1.0 Pa by controlling the flow rate of $N_2$ gas.

(3) The PFA substrate/AlN layer was heated in the vacuum chamber and kept at 250° C.

(4) The intermediate Ag layer was deposited by using a pure Ag target (76 mm diameter, 5 mm thick) at an argon gas pressure of 1.0 Pa.

(5) The top AlN layer was deposited with reactive sputtering by using an Al target (76 mm diameter, 5 mm thick), in a manner as same as that of the step (2) for the bottom AlN layer.

As to the sample of PFA substrate/AlN layer/Ag layer/AlN layer obtained by executing the steps (1) to (5), the radio-wave transparency, the mean size of Ag particles, the means thickness and the reflectance were measured by the methods as same as those employed in the third embodiment.

A. Radio-wave Transparency

The surface resistivity (Ω/sq) of the sample obtained by executing the steps (1) to (5) was measured by a surface resistivity measuring apparatus (MEGARESTA H0709) of Sisido Electric Company. The measurement value of the sample was greater than or equal to $9.9\times10^{12}$ Ω/sq which indicates that the sample sufficiently satisfies the radio-wave transparency.

B. Size Distribution of Silver Particles

A surface of the sample of the PFA substrate/AlN/Ag/AlN obtained by executing the steps (1) to (4) was searched by field emission type scanning electron microscope (FE-SEM) using a Hitachi S-4500. The obtained image was analyzed by an image analysis software "Image-Pro PLUS" of Cybemetics Company. As a result, the mean particle size was 330 nm, and the area ratio was 0.70.

C. Mean Thickness of Silver Particles

As to the sample obtained by executing the steps (1) to (5), the orientation of crystals was evaluated. Crystalline phases found in the sample were studied by x-ray diffraction (XRD) with a Rigaku RINT-1500 using Cu Kα radiation. On the basis of a result of the x-ray diffraction (XRD) analyses, the thickness of the crystalline phases in the silver layer as just produced was obtained by substituting the half height width of Ag(111) plane peak into the Scherrer's equation (17). The obtained value of the thickness was 25 nm.

D. Reflectance

Figure 13:
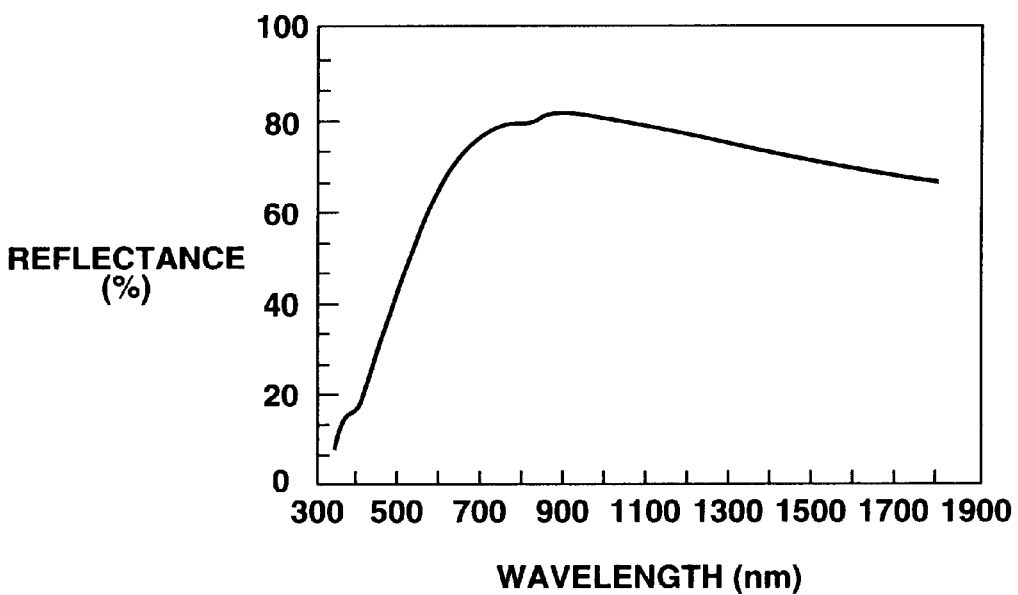
FIG. 13 is a graph showing reflective spectra of a frequency selective plate of a seventh embodiment.

Reflectance spectra of a sample just produced by executing the steps (1) to (5) was measured from 340 to 1800 nm at room temperature using a Hitachi U-4000 spectrophotometer. As shown in FIG. 13, the reflectance at the wavelength 900 nm was 82%. The value is very high and will be due to the execution of the step (4) for varying the Ag layer into particles.

The entire contents of Japanese Patent Applications No. 11-90597, 11-157271, 11-157704 and 11-202461 filed respectively on Mar. 31, 1999 Jun. 4, 1999 Jun. 4, 1999 and Jul. 16, 1999 in Japan are incorporated herein by reference.

With the thus arranged embodiments according to the present invention, it is possible to provide a frequency selective plate which performs high transparency of radio waves and visible rays while mainly reflecting near-infrared rays of solar radiation. This improved frequency selective plate contributes to prevent radio wave problem such a generation of ghost in TV screen or communication trouble of handy phones or degradation of glass antenna while shielding solar radiation.

Although the invention has been described above by reference to certain embodiments of the invention, the invention is not limited to the embodiments described above. Modifications and variations of the embodiments described above will occur to those skilled in the art, in light of the above teaching. For example, the embodiments have been shown and described such that the dielectric layer on the substrate and the dielectric layer on the Ag layer dispersed with Ag particles are formed by the sputtering method, it will be understood that the dielectric layer may be formed by various methods such as sputtering method, vacuum deposition method, CVD (Chemical Vapor Deposition) method, thermal spraying method, and ion plating method.

What is claimed is:

1. A frequency selective plate having a radio wave transparent property, said frequency selective plate comprising:
    a substrate being one of a glass substrate and a glass substrate coated with a transparent dielectric layer; and
    an Ag layer constituted by Ag particles of discrete flake form, a mean size of the Ag particles ranging from 100 nm to 0.5 mm and a thickness of the Ag particles ranging from 5 nm to 1 μm, said layer being coated on said substrate.

2. A frequency selective plate as claimed in claim 1, wherein said Ag layer is produced by depositing a continuous Ag layer on said substrate by way of sputtering and by changing the continuous Ag layer into the Ag particles of discrete flake form by heat treatment at a temperature lower than the glass transition point.

3. A frequency selective plate as claimed in claim 1, further comprising a second Ag layer which is dispersed with Ag particles and is coated on said Ag layer.

4. A frequency selective plate as claimed in claim 3, further comprising a dielectric layer coated on said Ag layer and under said second Ag layer.

5. A frequency selective plate as claimed in claim 3, wherein said second Ag layer is produced by depositing a continuous Ag layer on said Ag layer by means of sputtering and varying the continuous Ag layer into Ag particles by heat treatment.

6. A frequency selective plate as claimed in claim 1, wherein polycrystalline Ag of the Ag particles obtained by the heat treatment has a half height width of Ag(111) peak identified by x-ray diffraction, the half height width being smaller than or equal to 85% of that of the Ag layer before the heat treatment.

7. A frequency selective plate as claimed in claim 1, further comprising a dielectric layer coated on said Ag layer.

8. A frequency selective plate as claimed in claim 1, further comprising an AlN layer coated on said Ag layer.

9. A frequency selective plate as claimed in claim 1, wherein a reflectance of the frequency selective plate takes a maximum value when a wavelength of ray applied to the frequency selective plate ranges from 600 nm to 1500 nm.

10. A frequency selective plate as claimed in claim 1, wherein a shield effect ($E_s$) of the frequency selective plate is defined by the following equation (18) and is greater than or equal to 0.3:

$$E_s = \frac{\sum_{\lambda=680}^{1800} [R_{dp}(\lambda) I_{sr}(\lambda)]}{\sum_{\lambda=680}^{1800} [I_{sr}(\lambda)]}, \tag{18}$$

11. A frequency selective plate having a radio wave transparent property, said frequency selective plate comprising:
    a substrate being one of a glass substrate and a glass substrate coated with a transparent dielectric layer; and
    a layer coated on said substrate, said layer consisting of Ag flakes having a mean particle size of from 100 nm to 0.5 mm and a thickness of from 5 nm to 1 μm, so that said layer is highly transparent to radio waves and visible rays while reflecting near-infrared rays of solar radiation.

* * * * *